United States Patent
Ruottu et al.

(10) Patent No.: US 6,612,250 B2
(45) Date of Patent: Sep. 2, 2003

(54) METHOD OF CONTROLLING THE TEMPERATURE OF A REACTION CARRIED OUT IN A FLUIDISED BED REACTOR

(75) Inventors: Seppo Kalervo Ruottu, Karhula (FI); Lauri Tapio Ruottu, Karhula (FI)

(73) Assignee: Einco Oy, Karhula (FI)

( * ) Notice: Subject to any disclaimer, the term of this patent is extended or adjusted under 35 U.S.C. 154(b) by 0 days.

(21) Appl. No.: 10/114,959

(22) Filed: Apr. 2, 2002

(65) Prior Publication Data

US 2002/0191732 A1 Dec. 19, 2002

(51) Int. Cl.⁷ .................. F23G 5/30; F28D 13/00
(52) U.S. Cl. ............... 110/346; 110/190; 110/243; 122/40; 208/80; 165/104.16
(58) Field of Search ............... 110/346, 243, 110/244, 245, 190; 208/113, 127, 164, 80; 122/40; 165/104.16, 104.18

(56) References Cited

U.S. PATENT DOCUMENTS

| | | | |
|---|---|---|---|
| 4,211,636 A | | 7/1980 | Gross et al. |
| 4,473,032 A | * | 9/1984 | Maintok ............ 122/4 D |
| 4,552,203 A | | 11/1985 | Chrysostome et al. |
| 4,770,237 A | * | 9/1988 | Morin et al. ......... 165/104.16 |
| 4,881,592 A | * | 11/1989 | Cetinkaya ........... 165/104.16 |
| 5,070,822 A | * | 12/1991 | Kinni et al. ......... 122/4 D |
| 5,171,542 A | * | 12/1992 | Sarkomaa ............ 422/146 |
| 5,226,475 A | * | 7/1993 | Ruottu ............... 165/104.18 |
| 5,282,506 A | * | 2/1994 | Ruottu ............... 165/104.18 |
| 5,363,812 A | * | 11/1994 | Belin et al. ......... 122/4 D |
| 5,505,907 A | * | 4/1996 | Hiltunen et al. ...... 422/146 |
| 5,570,645 A | | 11/1996 | Garcia-Mallol |
| 5,634,516 A | * | 6/1997 | Myohanen et al. ..... 165/104.16 |
| 5,797,336 A | * | 8/1998 | Muller et al. ........ 110/345 |
| 5,800,697 A | * | 9/1998 | Lengemann .......... 208/159 |

FOREIGN PATENT DOCUMENTS

| | | | |
|---|---|---|---|
| EP | 0795112 B1 | * 9/1997 | .......... F28D/13/00 |
| FI | 842098 | 5/1984 | |
| GB | 591417 | 2/1945 | |
| WO | WO 92/11499 | 7/1992 | |

* cited by examiner

Primary Examiner—Ira S. Lazarus
Assistant Examiner—K. B. Rinehart
(74) Attorney, Agent, or Firm—Birch, Stewart, Kolasch & Birch, LLP

(57) ABSTRACT

Method of controlling the temperatures of an exothermic process carried out in a suspension of solids in a reactor system formed by a wind box (2), a vertical riser (5), which is essentially not cooled, a particle separator (6), at least one set of recycling channels (9), which are not cooled, and at least one cooled set of recycling channels (12). According to the invention, the flow of solids travelling through the recycling channel (9), which is no cooled, as adjusted based on the temperature difference (T2–T1) between the upper and lower parts of a riser (5), which is not cooled, and the flow of solids travelling through the heat exchanger (12) is adjusted based on the temperature (T1) of the lower part or the temperature (T2) of the upper part of the riser tube. The control of the riser temperature is thus exclusively based on the regenerative heat transfer of the solids returned from the heat exchangers. In order for the solids returning from the heat exchanger not to create too great a temperature difference in the riser tube, solids that are not cooled are also returned to the lower part of the riser chamber in accordance with the set point control of the temperature difference of the riser tube. As all the temperatures of the thermally insulated riser tube are between the temperatures of its lower and upper parts, a perfect temperature control of the reactor is achieved by means of the simple method according to the invention.

9 Claims, 1 Drawing Sheet

Figure 1:
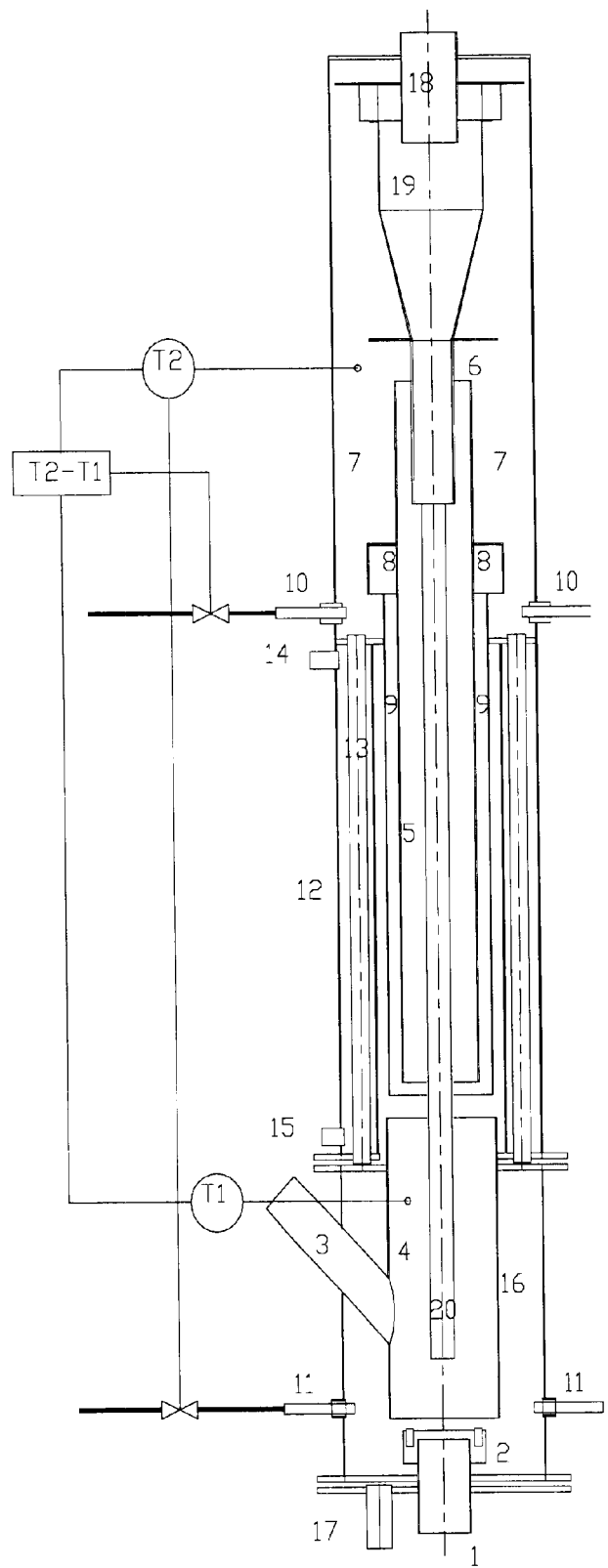

METHOD OF CONTROLLING THE TEMPERATURE OF A REACTION CARRIED OUT IN A FLUIDISED BED REACTOR

This nonprovisional application claims priority under 35 U.S.C.§119(a) on Patent Application No. 20010676 filed in Finland on Apr. 2, 2001, which is herein incorporated by reference.

The invention relates to a method for defining the temperature at every point of a multiphase reactor within desired upper and lower limits.

In particular, the invention concerns a method of controlling the temperatures of an exothermic process carried out in a suspension of solids in a reactor system formed by a wind box, a vertical riser, which is essentially not cooled, a particle separator, at least one set of recycling channels, which are not cooled, and at least one set of recycling channels with a heat exchanger for controlling the temperatures of an exothermic process carried out in a suspension of solids in a multiphase reactor.

In this application, the "multiphase reactor" refers to a reactor, wherein, in addition to a continuous phase, which usually is a gas, at least one solid phase in particulate form is simultaneously present. Such a reactor system usually comprises a wind box with a gas feed nozzle, a vertical, essentially not cooled, riser tube connected with the wind box, generally having a vertical central axis and having a lower portion, which is equipped with a feed nozzle for solid matter, a particle separator fitted on the riser at the upper portion thereof for separating particles from the flow of the solids suspension in the riser, and an outlet pipe or opening or similar outlet means or channel for the separated particles for withdrawing the particles from the separator, and recycling channels connected with the particle separator, which channels can be used for recycling at least a part of the solid matter to the lower portion of the riser, whereby the recycling channels comprise at least one set of recycling channels, which are not cooled, and at least one cooled set of recycling channels.

In terms of fluid mechanics, the multiphase reactors can be divided into those with packed bed, fluidised-bed, and circulation states. In the packed state, the particles are in continuous contact with one another and gas flows between the particles. If the falling speed of a single particle is greater than the voids content velocity of the gas, the volume fraction of the particles can settle at such a value that any supporting reactions between the particles disappear, whereby the system sets in the fluidised state. In the circulation state, the falling rate of a single particle is lower than the voids content velocity of the gas.

The processes with a circulation state are further divided into those, where both gas and the particles travel once through a riser tube and into those, where the particles are returned back to the lower part of the riser tube. Regarding the latter systems with a circulation state, the Circulating Fluidised Bed (CFB) is the most well known. The necessary parts of the CFB are a vertical riser tube or riser, a particle separator, and a return pass. Furthermore, its essential parts comprise a gas distribution plate and often a generally pneumatic device that controls the solids flow of the return tube. Invariably, the particle separator is a cyclone, the shape and structure of which are defined, among others, in accordance with manufacture technology compromises. The purpose of the return tube is to return the solids separated in the cyclone back to the lower part of the riser.

As the effect of the temperature on the final result of the process is crucially important irrespective of the type of reactor, efforts should be made to maintain the temperatures in all parts of the reactor and in all conditions within a required temperature window.

Regarding the known reactor types, the CFB reactors offer prerequisites which have the best starting points for solving any problems related to the control of temperatures. Cooling surfaces are fitted in the riser chamber, by means of which, when operating on a nominal power and fuels, the temperature level of the reactor settles approximately at the desired level. In the CFB reactors, heat transfer can be influenced to a limited extent by the amount of particles in the riser tube. An example of an invention based on this is the FI Patent Application No. 851296, which makes it possible to maintain the temperature of a certain part of the riser chamber within the desired range of operation, if operation is carried out near the design values. The PCT Application No. PCT/SE83/00089 discloses an invention, wherein by adjusting the solids flow going through the cooled riser tube, efforts are made to keep the temperature of the fluidised bed within the permitted limits.

The 1-point temperature control of both inventions mentioned above is defective and results in the desired result only when many conditions are fulfilled. Both the above-mentioned inventions are also characterized in that heat transfer in them mainly takes place in the riser tube.

It is also known in the art to place two or more recycle channels in parallel and to provide at least one of them with a heat exchanger, to which a part of the solids separated in a cyclone is directed based on the temperature of a specific point of the riser. Examples of embodiments of this type are disclosed in FI Patent Application No. 842098 and U.S. Pat. No. 4,552,203.

FI Patent Application No. 842098 discloses an apparatus having at least one cooled and at least one not cooled recycle channel fitted between the cyclone separator and the reaction chamber, the flows of which are being adjusted with the aid of regulators at the upper and lower ends of the set of channels. It can be seen from the description of the patent application that the invention concerns "regulation of the combustion temperature to value in the range of 800 to 900° C", i.e. 1-point regulation.

U.S. Pat. No. 4,552,203 concerns an embodiment, which essentially is the same as the one of FI Patent Application 842098 and which differs therefrom mainly with respect to the field of application and the technical layout of the apparatus. Because the technical solution of U.S. Pat. No. 4,552,203 primarily concerns carburators (substoichiometric oxidation), it does not deal with any cooling of the reaction chamber. In carburators, cooling is generally to be avoided, whereby the need for cooling is either small or nonexistent. The regulation of the temperature level of carburators is usually based on an adjustment of the stoichiometry of the oxidation process. The method according to U.S. Pat. No. 4,552,203 is characterized in that even if several separate control signals are transmitted from the regulating means to the regulators of the solids flow, the incoming control signal of the regulating means only comprises one temperature signal. This means that the separate control signals transmitted from the regulating means are determined by various correlations derived by control engineering and the embodiment is actually based on 1-point temperature regulation. Thus, not even the invention disclosed in US Patent Specification 4,552,203 solves the problem relating to a control of the temperature difference over the reaction chamber.

The fludized bed heat exchanger arranged in the second recycle channel of the apparatus of U.S. Pat. No. 4,552,203 is in practice problematic as far as erosion is concerned. As regards heat transfer, it is also disadvantageous since the heat-releasing solids are almost in isothermic state because of efficient mixing, which minimizes the average temperature difference.

The cooler for the recycle channel disclosed in FI Patent Application No. 842098 is thermally disadvantageous and prone to erosion because the velocity of the free-falling solids becomes very high and the flow is turbulent. Since the total amount of recycled solids is not known, it is possible to end up in a situation, in which either the lower part of the riser channel is cooled too much by the cooled solids recycled from the fluidized bed cooler, or not enough energy is transferred to the heat exchanger of the recycle channel.

It is common for all said known apparatuses and methods that they attempt to solve the problems relating to temperature control of the reactor by using one temperature measurement. This is, however, not possible in practice, because along the height of the reactor there is unavoidably formed a temperature difference, whereby it is not sufficient to keep the temperature of the reactor at a set value at some point of height. For instance, in case of steam boilers, the problem with moist fuels is that the temperature of the lower part of the combustion chamber becomes so low that, first, the combustion reaction moves higher up and further development may lead to the combustion chamber being extinguished. The temperature difference over the height of the reactor can be several hundred degrees, whereas proper control of the combustion would require a temperature difference of no more than one hundred degrees, preferably only some tens of degrees. Because of this, the basic idea of the above-mentioned, known inventions for temperature control is deficient.

It is an aim of the present invention to eliminate the problems of the known art and to provide an entirely novel solution for regulating the temperature of a reactor.

A characteristic feature of the present invention is that the reaction chamber is preferably not cooled. The basic idea of the invention starts from the fact that it should be possible to adjust the temperature of each point of the reaction chamber to a required temperature window, which has a magnitude of about 20 to 100° C., preferably about 40 to 80° C. For this reason, the heat loss of the riser of the reactor should be small and the heat transfer required by the temperature level should be regulated to precisely the desired rate by means of a heat exchanger, which is placed externally to the riser. Heat transfer is adjusted by directing the circulating solids through the heat exchanger located in the recycling pass in accordance with the temperature of the lower (T1) or the upper end (T2) of the riser tube.

The control of the temperature of the riser tube is, thus, exclusively or at least mainly based on the regenerating effect of the solids recycled through the heat exchangers. In order for the solids returning from the heat exchanger not to create too great a temperature difference in the riser tube, it is further necessary to return some solids that are not cooled to the riser tube, directed by the set point control of the temperature difference (T2−T1) of the upper and lower parts of the riser. As all the temperatures of the thermally insulated riser tube are between the temperatures of its lower and upper parts, the method according to the invention provides complete control of the reactor temperatures.

In other words, the solids flow (i.e. mass flow) through the recycle channel, which is not cooled, is conducted in dependency of the temperature difference between the upper and the lower part of the riser tube, and the solids flow through the heat exchanger is conducted in dependency of the temperature of the lower part or the upper part.

Preferably, in the heat exchanger, which adjusts the temperature difference of the riser tube, the solids flow in a packed state, whereby erosion of the heat exchanger is avoided. The packed state is also advantageous in terms of heat transfer, because in that case, the solids do not mix. A change of the temperature of the solids travelling through the heat exchanger can be maximized by connecting the heat exchanger in counter-flow, whereby the flow of solids needed for the heat transfer power at a certain dimensioning of the heat exchanger is minimized. Another advantage caused by the packed state is the heat transfer increases to a very high level, when the solids flow increases. Instead, in the return tubes, which are not cooled, it is appropriate to apply an unpacked state of flow, as in that case, a great mass flow density can be achieved, whereby the dimensions of the tubes are minimized.

More specifically, the method according to the invention is mainly characterized by what is stated in the characterizing part of claim 1.

A problem with present CFB boilers is that the height of the combustion chamber is determined in compliance with the requirements of the heat transfer, whereby the height is increased to an unnecessary extent. As a result, in order for the pressure loss of the combustion chamber not to become too great, the volume fraction of the solids and the solids flow must be limited to a low level. In principle, of course, we could consider fitting heat surfaces inside the riser chamber, but because of erosion, corrosion, and mixing problems, among others, in practice, this is not possible. In the solution according to the invention, a sufficient number of heat surfaces can be located in the return tube without unnecessarily increasing the height of the burner. When there are no heat surfaces exposed to wearing in the riser, the gas velocity can be increased from the present value, which is advantageous both for the size of the device and the range of power adjustment.

Superheaters, which are exposed to the corrosive compounds contained by ash and to erosion, must often be fitted into the burners of CFB boilers. Ashes containing chlorine, in particular, are known to have caused rapid corrosion of superheater tubes. From also this point of view, it is sensible to locate the heat delivery surfaces in the return tubes of the solids, where they are not exposed to corrosion. In the method according to the invention, the superheater would be fitted into a third return tube, the adjustment of which would be carried out in accordance with the superheating temperature. This heat exchanger would also be connected in counter-flow mode and the solids would flow through it in a packed state.

It is typical for the invention that the solids circulations of all its return channels, of which there are at least two, are directed as free variables. Instead of keeping the pressure difference of the riser in its control value, which is characteristically the case with CFB, in the method according to the invention, it is allowed to freely vary from zero to its maximum value, which is exclusively determined by the performance characteristics of the flow machines, which take care of the gas flow of the riser tube. Accordingly, it is justifiable to call the method according to the invention, wherein all the solids circulations are accurately controlled, a Controlled Solids Circulation (CSC) method.

Generally, combustion and gasification are seen as separate processes, although both cases deal with oxidation. Combustion is perceived as oxidation with excess oxygen present, and gasification as oxidation with an oxygen deficit. The gasifiers are principally reactors without cooling and the combustion reactors are cooled reactors, which do not apply to both processes without any changes. As the method according to the invention can be used to adjust the cooling as a free variable, it can be used to oxidize the fuel precisely to the desired oxidation degree without making any changes in the reactor. In test runs, the oxygen ratio (oxygen/theoretical oxygen) was continuously changed from 1.2 to 0.7 so that the withdrawal temperature of the reactor and the temperature difference of the riser chamber were in automatic adjustment. In the test runs, both temperature adjustments worked accurately and there were no problems in transferring from an excessive oxygen process to a process with a great oxygen deficit by means of the equipment.

During combustion, the temperature is usually about 650 to 1000° C., preferably about 700 to 900° C., and by means of the regulating method according to the invention, it can be kept within a temperature span of about 40 to 80° C.

The reactor according to the invention also offers significant advantages in several reactors of chemistry and the oil refining industry. For example, in FCC units, both a regenerator with excess oxygen and a cracking reactor working on approximately a zero oxygen ratio must be capable of accurately adjusting the temperatures of both units. By connecting in parallel two CSC reactors according to the invention, a reactor system that fills the requirements of the FCC unit is achieved in an ideal way.

During combustion, the recycling solids used comprise inert inorganic, particulate matter, such as sand, which works as heat transfer medium. The fluidization gas is then air or some other oxygen-containing gas. In catalytic processes, the recycling solids is a solid catalyst. Typically, a part of the catalyst is conducted to regeneration, another part of it being recycled to the process.

In the following, an embodiment of the invention will be described in more detail with reference to FIG. 1, which, in sectional side-view, shows the principal structure of a circulating bed reactor.

In FIG. 1, the inlet nozzle of the fluidisation gas is marked with number 1, the gas flowing from the joint via a distributor plate 2 to the lower part 4 of a riser. The solids are fed into the reactor through a joint 3. The top part of the riser tube is marked with number 5 and the nozzle of the primary separator located at its upper end with number 6. The chamber part of the primary separator is marked with number 7, wherein most of the solids are separated from the gas and deposited on the bottom of the chamber 7, forming a packed layer, from where part of the solids is directed to the top part 8 of a channel 9, which is not cooled, by means of actuators 10, from which top part the solids fall as loose particles back to the lower part 4 of the riser tube. The other part of the solids that are packed in the chamber 7 is directed to the lower part 4 of the riser tube through the tubes 13 of a cooler 12 by means of actuators 11. The inlet and outlet units of the cooling agent are marked with numbers 14 and 15. The discharge unit of the solids is marked with number 17.

In various applications, the primary separator provides sufficient separation; therefore, a secondary cyclone is needed only when very small penetration is required. The most suitable way to implement the secondary separator is shown in FIG. 1. The prepurified gas is lead from the chamber 7 of the primary separator through to a secondary separator 19, from where the particles are returned back to the lower part 4 of the riser chamber through a return tube 20. The purified gas exits through a centre tube 18.

The outlet temperature T2 of said system is controlled by adjusting the flow of solid material travelling through the heat exchanger of the cooled recycle cannel 12 by regulating actuator 11 based on set value regulation depending on temperature T2. The vertical temperature difference of the riser is controlled by adjusting the flow of solid material travelling through the recycle channel 9, which is not cooled, by regulating actuator 10 based on set value regulation depending on the temperature difference T2−T1. Practical functioning of the method according to the invention has also been established by extensive test runs, which were carried out by pilot equipment.

TABLE 1

The dimensions of the CSC reactor.
The basic structure according to FIG. 1

| | | |
|---|---|---|
| Outer dimension: | | |
| Height | m | 3.0 |
| Diameter | m | 0.31 |
| Primary separator: | | |
| Type: An inertia separator fitted around the riser | | |
| Height of the port | m | 0.03 |
| Secondary separator: | | |
| Type: Multiport cyclone | | |
| Number of vanes | — | 12 |
| Height of the port | m | 0.04 |
| Minimum clearance | m | 0.015 |
| Riser: | | |
| Number of tubes | — | 1 |
| Tube diameter | m | .15 |
| Tube height | m | 2.0 |
| Return tube of the secondary separator: | | |
| Type: Tube | | |
| Diameter | m | 0.04 |
| Height | m | 1.8 |
| Discharger of the secondary separator return tube: | | |
| Mode of operation: | Self-controlled | |
| Return tube without cooling: | | |
| Type: A ring fitted around the riser. | | |
| Width | m | 0.01 |
| Height | m | 1.5 |
| Discharger of the return tube without cooling: | | |
| Type: Pneumatic | | |
| Mode of operation | Controlled | |
| Number of nozzles | — | 4 |
| Cooled return tube: | | |
| Type: A tubular heat exchanger fitted around the riser. | | |
| Width | m | 0.1 |
| Height | m | 1.0 |
| Discharger of the cooled return tube: | | |
| Type: Pneumatic | | |
| Mode of operation: | Controlled | |
| Number of nozzles | — | 4 |

The object of this series of tests was to verify that the parallel, adjusted return tubes in the device according to the invention work without problems, and to study the heat transfer from solids moving in a packed state to a wall.

In the test runs, among others, oxidation of various sawdust batches with varying moisture and that of dry de-inking slurry (humidity less than 10% by mass) was carried out. In all the test runs, it was possible to keep the exit temperature of the reactor within the desired values in varying running conditions by controlling the cooled circulation, and the temperature difference of the riser by controlling the circulation without cooling. Both controls kept the temperatures at their set values at an accuracy of a few degrees. As the solids flew in a packed state in the cooled return tube, the counter current principle could be used in the cooling heat exchanger. As a summary of the test runs, it can be stated that the method according to the invention was found to be working for all parts also when applied in practice.

What is claimed is:

1. A method of controlling the temperatures of an exothermic process carried out in a suspension of solids in a reactor system formed by a wind box (2), a vertical riser (5), which is essentially not cooled, a particle separator (6), at least one set of recycling channels (9), which are not cooled, and at least one cooled set of recycling channels (12) with a heat exchanger, characterized by adjusting the flow of solids travelling through the recycling channel (9), which is not cooled, based on the temperature difference (T2−T1) between the upper and lower parts of a riser (5), which is not cooled, and by adjusting the flow of solids travelling through the heat exchanger (12) based on the temperature (T1) of the lower part or the temperature (T2) of the upper part of the riser tube.

2. The method according to claim 1, characterized in that the solids circulations of the other recycling channels parallel to the recycling channels (9), (12) are controlled as free variables based on a process quantity characteristic for the function of the respective recycling channel.

3. The method according to claim 1 or claim 2, characterized by directing the flow of solids through the recycle channel (9), which is not cooled, by means of an actuator (10) fitted at the upper part of the channel.

4. The method according to claim 1 or claim 2, characterized by directing the flow of solids through other recycle channels than the one (9), which is not cooled, by means of an actuator (11), which is fitted at the lower end of the recycle channel.

5. The method according to claim 1, characterized by transferring heat to two or several heat-receiving flows in the same recycle channel (12).

6. The method according to claim 1, characterized in that solids are recycled through the recycling channel (9), which is not cooled, in an unpacked state.

7. The method according to claim 1, characterized in that solids are recycled through the cooled recycling channel (12) in a packed state.

8. The method according to claim 1, characterized in that the exothermic reaction is carried out in a circulating bed reactor, which comprises a wind box (2) with a gas feed nozzle (1), a vertical, essentially not cooled, riser (5) connected with the wind box, generally having a vertical central axis and having a lower portion (4), which is equipped with a feed nozzle (3) for solid matter, a particle separator (6) fitted on the riser at the upper portion thereof for separating particles from the flow of the solids suspension in the riser and having an outlet means (7) for the separated particles, and recycling channels (9; 12) connected with the outlet means of the particle separator, which channels can be used for recycling at least a part of the solid matter to the lower portion of the riser, whereby the recycling channels comprise at least one set of recycling channels (9), which are not cooled, and at least one cooled set of recycling channels (12).

9. The method according to claim 1 characterized in that the exothermic reaction is a combustion reaction or cracking reaction.

* * * * *